US009821530B2

(12) United States Patent
Wilenski et al.

(10) Patent No.: US 9,821,530 B2
(45) Date of Patent: Nov. 21, 2017

(54) COMPOSITE LAMINATE INCLUDING INTERLAYERS WITH THROUGH-PLANE REGIONS FUSED TO FIBER BEDS

(71) Applicant: The Boeing Company, Chicago, IL (US)

(72) Inventors: Mark Stewart Wilenski, Mercer Island, WA (US); Kelsi Marie Hurley, Kent, WA (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 14/553,553

(22) Filed: Nov. 25, 2014

(65) Prior Publication Data
US 2016/0144595 A1    May 26, 2016

(51) Int. Cl.
*B32B 5/12* (2006.01)
*B32B 5/10* (2006.01)
(Continued)

(52) U.S. Cl.
CPC ............... *B32B 5/142* (2013.01); *B32B 1/00* (2013.01); *B32B 5/00* (2013.01); *B32B 5/02* (2013.01); *B32B 5/022* (2013.01); *B32B 5/10* (2013.01); *B32B 5/12* (2013.01); *B32B 5/14* (2013.01); *B32B 5/22* (2013.01); *B32B 5/24* (2013.01); *B32B 5/26* (2013.01); *B32B 7/00* (2013.01); *B32B 7/02* (2013.01); *B32B 7/04* (2013.01); *B32B 7/045* (2013.01); *B32B 7/08* (2013.01); *B32B 7/10* (2013.01); *B32B 7/12* (2013.01); *B32B 7/14* (2013.01); *B32B 27/00* (2013.01); *B32B 27/06* (2013.01); *B32B 27/08* (2013.01); *B32B 27/12* (2013.01); *B32B 27/26* (2013.01); *B32B 27/28* (2013.01); *B32B 27/38* (2013.01); *B32B 37/14* (2013.01); *B32B 2038/0076* (2013.01); *B32B 2250/00* (2013.01); *B32B 2250/40* (2013.01); *B32B 2260/021* (2013.01); *B32B 2260/046* (2013.01); *B32B 2264/00* (2013.01); *B32B 2264/02* (2013.01); *B32B 2264/0221* (2013.01); *B32B 2305/07* (2013.01); *B32B 2305/08* (2013.01); *B32B 2307/50* (2013.01); *B32B 2307/552* (2013.01);
(Continued)

(58) Field of Classification Search
None
See application file for complete search history.

(56) References Cited

U.S. PATENT DOCUMENTS 4,537,610 A * 8/1985 Armstrong .............. C03C 25/20
427/289
8,470,923 B2  6/2013 Boyle et al.
(Continued)

FOREIGN PATENT DOCUMENTS

EP  2653293 A1  10/2013

OTHER PUBLICATIONS

International Search Report for related International Application No. DE15192574; report dated Feb. 5, 2016.

*Primary Examiner* — Laura Powers
(74) *Attorney, Agent, or Firm* — Miller, Matthias & Hull LLP

(57) ABSTRACT

A composite laminate comprises first and second fiber beds, and an interlayer between the fiber beds. The interlayer includes toughened regions that extend between the fiber beds and are fused to the fiber beds.

21 Claims, 9 Drawing Sheets

(51) Int. Cl.

| | | |
|---|---|---|
| *B32B 5/02* | (2006.01) | |
| *B32B 5/00* | (2006.01) | |
| *B32B 5/22* | (2006.01) | |
| *B32B 5/26* | (2006.01) | |
| *B32B 27/12* | (2006.01) | |
| *B32B 27/06* | (2006.01) | |
| *B32B 27/00* | (2006.01) | |
| *B32B 7/00* | (2006.01) | |
| *B32B 7/04* | (2006.01) | |
| *B32B 7/08* | (2006.01) | |
| *B32B 1/00* | (2006.01) | |
| *B32B 5/14* | (2006.01) | |
| *B32B 37/14* | (2006.01) | |
| *B32B 5/24* | (2006.01) | |
| *B32B 7/02* | (2006.01) | |
| *B32B 7/10* | (2006.01) | |
| *B32B 7/12* | (2006.01) | |
| *B32B 7/14* | (2006.01) | |
| *B32B 27/08* | (2006.01) | |
| *B32B 27/26* | (2006.01) | |
| *B32B 27/28* | (2006.01) | |
| *B32B 27/38* | (2006.01) | |
| *B32B 38/00* | (2006.01) | |

(52) U.S. Cl.
CPC ... *B32B 2307/558* (2013.01); *B32B 2307/722* (2013.01); *B32B 2605/00* (2013.01); *B32B 2605/18* (2013.01)

(56) References Cited

U.S. PATENT DOCUMENTS

| | | |
|---|---|---|
| 8,517,300 B2 | 8/2013 | Simmons et al. |
| 8,686,069 B2 | 4/2014 | Wang |
| 8,796,164 B2 | 8/2014 | Restuccia et al. |
| 2004/0028884 A1* | 2/2004 | Woolstencroft ........ B29C 70/08 428/292.1 |
| 2004/0086699 A1* | 5/2004 | Schneider ................ B32B 5/16 428/292.1 |
| 2010/0086764 A1* | 4/2010 | Pepka ................... B29C 70/081 428/221 |
| 2012/0156422 A1* | 6/2012 | Kozar ................... B29C 70/202 428/113 |
| 2014/0151507 A1 | 6/2014 | Woodard et al. |
| 2014/0163139 A1* | 6/2014 | Wang ..................... C08L 63/00 523/435 |
| 2014/0178636 A1* | 6/2014 | Wu ........................ B32B 3/266 428/140 |

\* cited by examiner

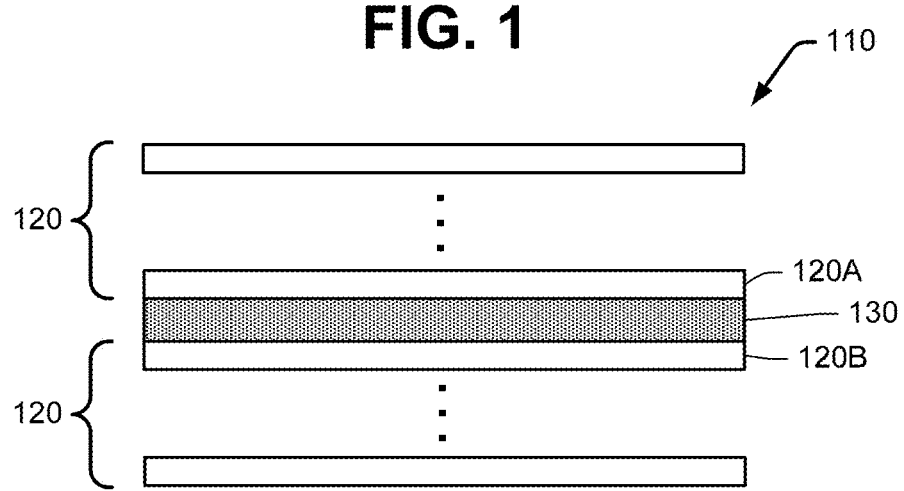
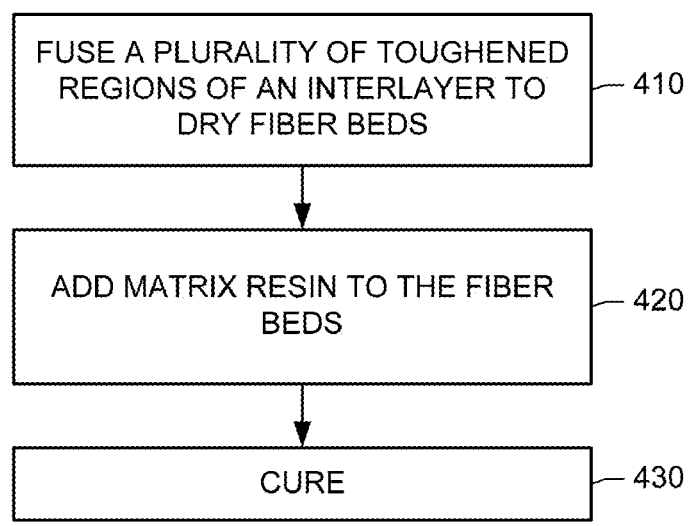

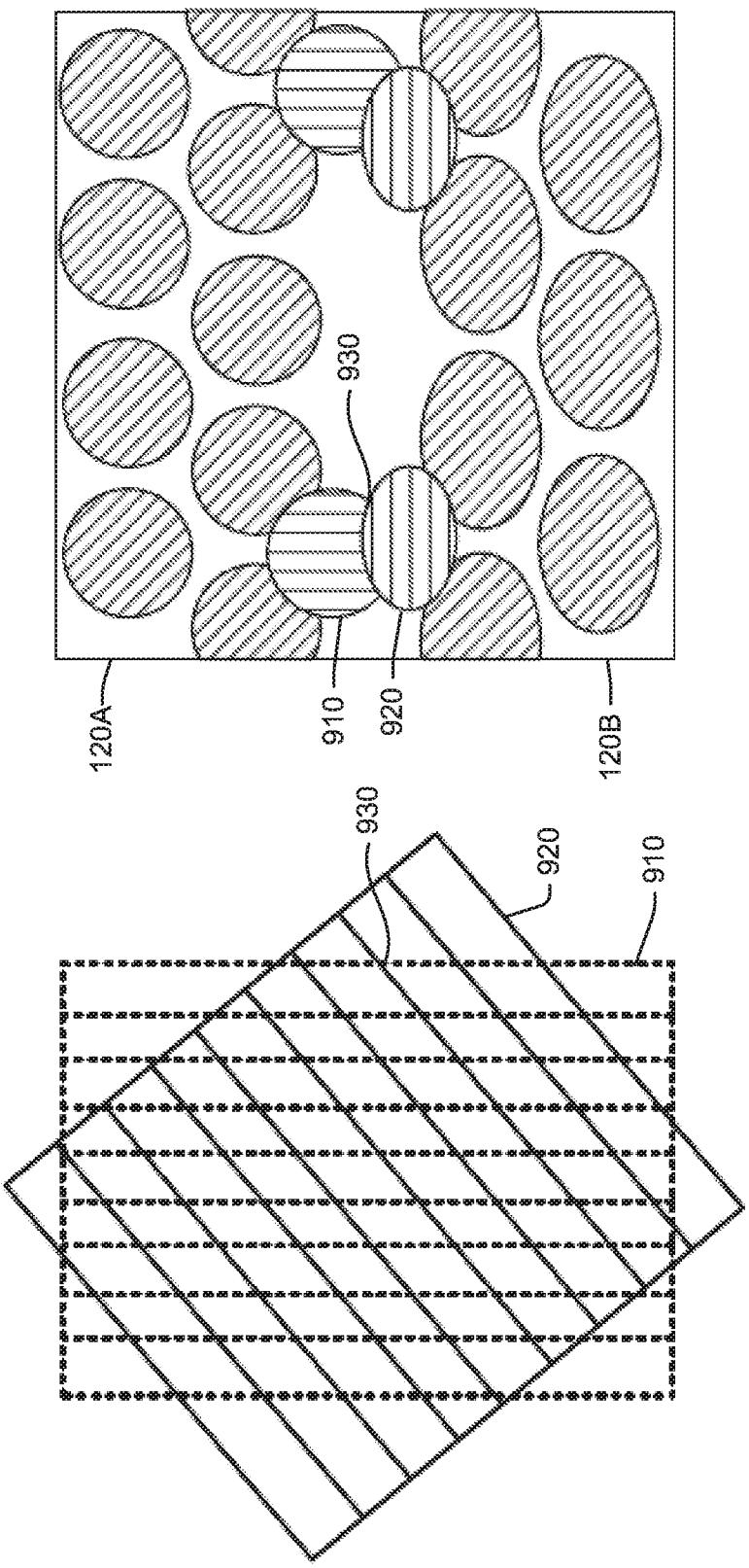

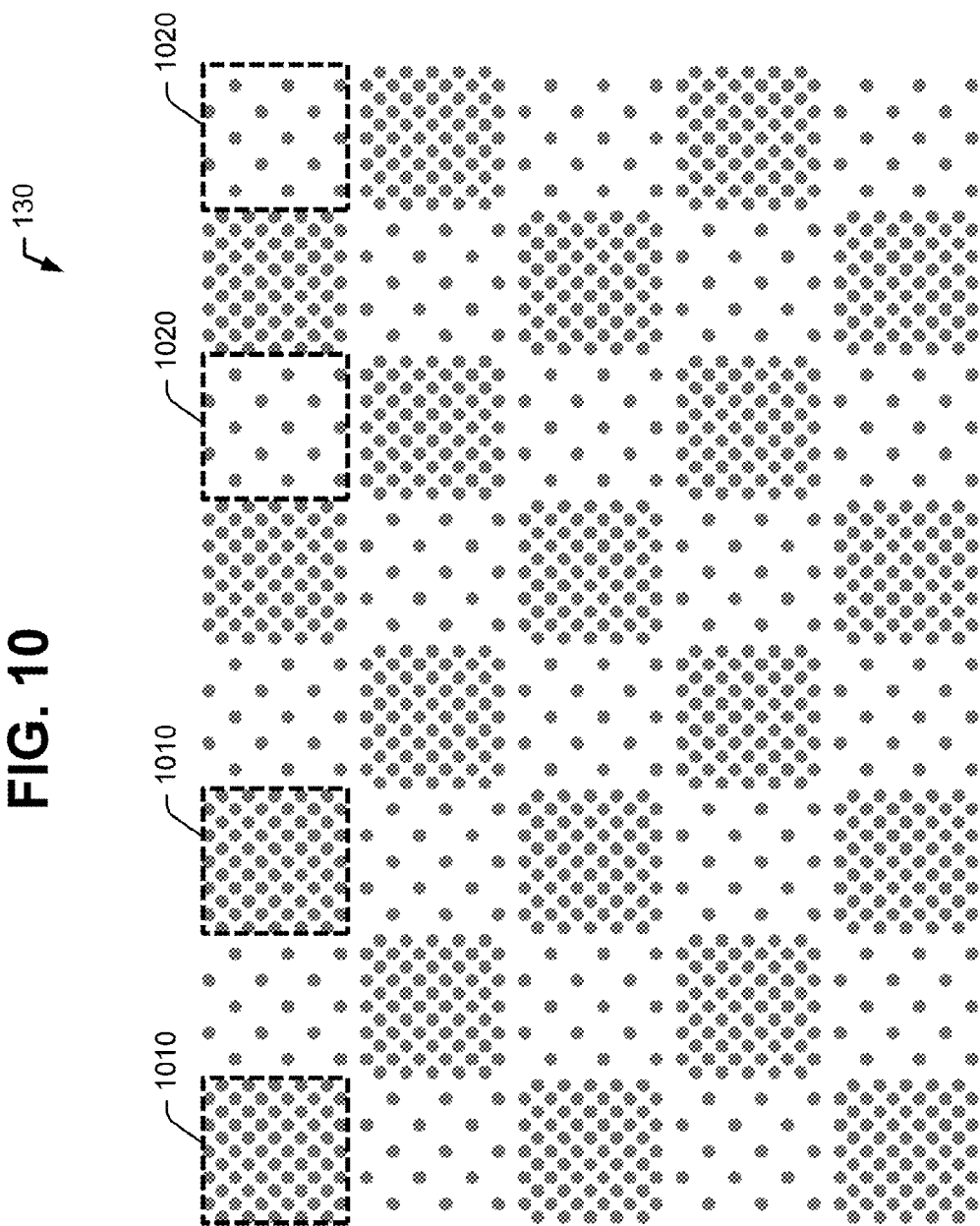

COMPOSITE LAMINATE INCLUDING INTERLAYERS WITH THROUGH-PLANE REGIONS FUSED TO FIBER BEDS

BACKGROUND

An impact to a composite laminate can cause cracks to initiate and propagate in or between fiber beds of the laminate. The cracks may be characterized as mode I cracks, mode II cracks, and mode III cracks.

Interlayers between fiber beds may be used to impede the propagation of mode I, mode II and mode III cracks. For instance, the interlayers may include thermoplastic spheres or resin with a high thermoplastic content.

SUMMARY

According to an embodiment herein; a composite laminate comprises first and second fiber beds, and an interlayer between the fiber beds. The interlayer includes toughened regions that extend between the fiber beds and are fused to the fiber beds.

According to another embodiment herein, a method comprises fabricating a composite laminate including fusing a plurality of thermoplastic regions of an interlayer to adjacent dry fiber beds.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of a composite laminate including first and second fiber beds, and an interlayer between the fiber beds.

FIG. 4 is an illustration of a general method of fabricating a composite laminate including an interlayer having toughened regions.

FIGS. 9A and 9B are illustrations of an interlayer including first and second layers of filaments oriented at different angles.

FIG. 10 is an illustration of a composite laminate having interlayers patterned for selective toughness.

DETAILED DESCRIPTION

Figure 2A:
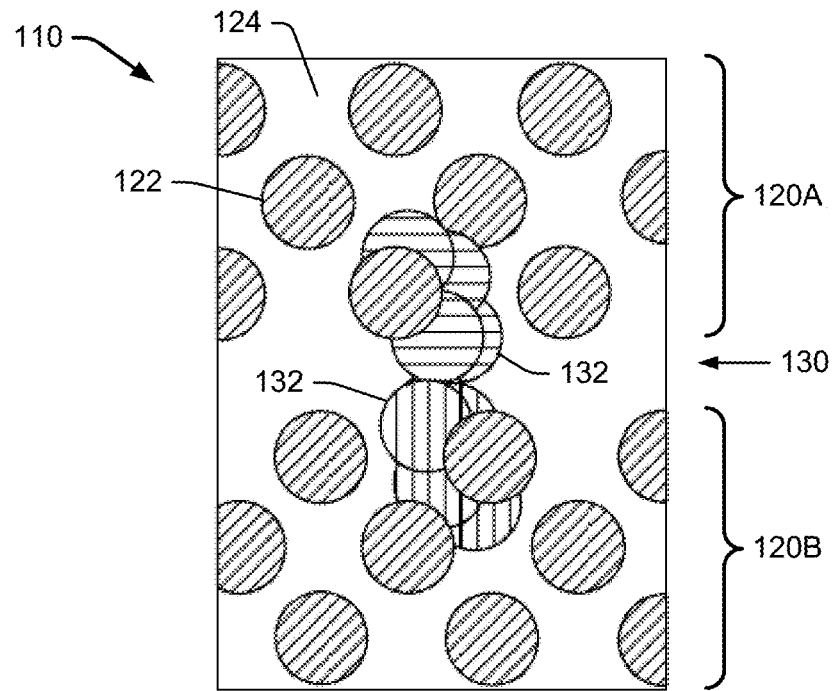
FIG. 2A is an illustration of an interlayer having toughened regions that are mechanically interlocked with adjacent fiber beds.

Referring to FIG. 1, a composite laminate 110 includes a plurality of fiber beds 120. A fiber bed 120 contains one or more rows of fibrous media. As a first example, a fiber bed 120 includes one or more rows of continuous unidirectional reinforcing fibers. As a second example, a fiber bed 120 includes a weave of continuous reinforcing fibers having different orientations. As a third example, a fiber bed 120 includes a random mat, whose reinforcing fibers are discontinuous, randomly oriented, and overlapping.

In some configurations, all reinforcing fibers in all of the fiber beds 120 extend in the same direction. In other configurations, the reinforcing fibers of some fiber beds 120 extend in different directions than the reinforcing fibers of other fiber beds 120. For example, the composite laminate 110 may include one or more fiber beds 120 having fibers oriented at zero degrees with respect to a reference direction, and one or more fiber beds 120 having fibers oriented at a non-zero degree angle (e.g., 45 degrees, 90 degrees) with respect to the reference direction.

Different fiber beds 120 of the composite laminate 110 may have the same types of fibers or different types of fibers. Fiber types may differ by size, modulus, composition, etc.

The reinforcing fibers are embedded in a matrix. Different fiber beds 120 may have the same matrix composition or different compositions.

The composite laminate 110 further includes at least one interlayer 130 (although only one interlayer 130 is illustrated, the composite laminate 110 may include at least one additional interlayer 130). An interlayer 130 is located between two adjacent fiber beds 120, which will be referred to as first and second fiber beds 120A and 120B.

Figure 2B:
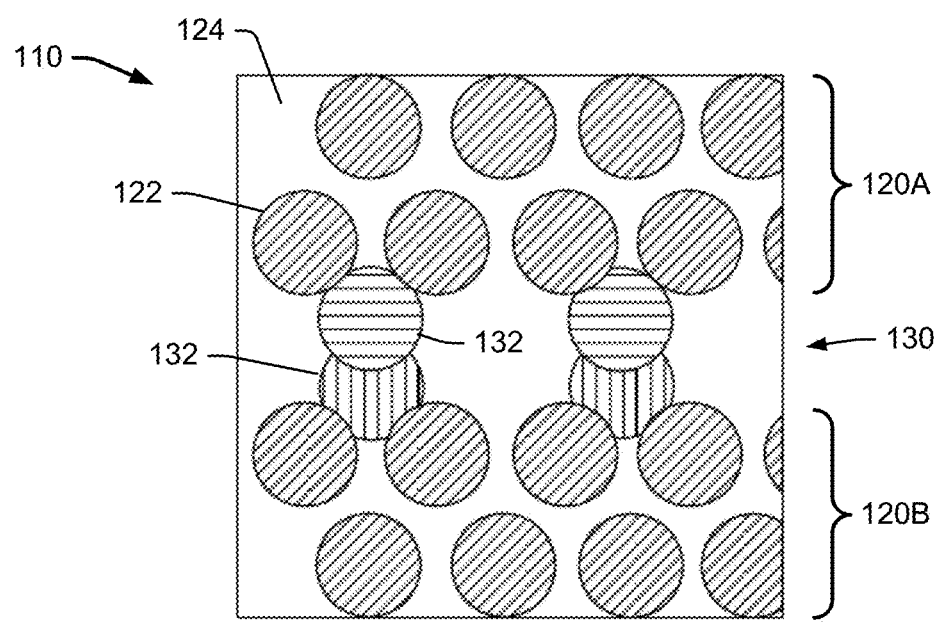
FIG. 2B is an illustration of an interlayer having toughened regions that are bonded to adjacent fiber beds.

Additional reference is made to FIGS. 2A and 2B, both of which illustrate details of the first and second fiber beds 120A and 120B. Each fiber bed 120A and 120B includes reinforcing fibers 122 embedded in a matrix 124.

FIGS. 2A and 2B also illustrate details of the interlayer 130. The interlayer 130 includes toughened regions 132 that extend between (i.e., bridge) the adjacent first and second fiber beds 120A and 120B in a through-plane direction. The toughened regions 132 are continuous in the through-plane direction. In some configurations, the toughened regions 132 are discontinuous in an in-plane direction (FIGS. 2A and 2B both show toughened regions 132 that are discontinuous in the in-plane direction). In some configurations described below (e.g., toughened regions 132 formed by fused particles, and toughened regions 132 formed by overlapping filaments), the toughened regions 132 may have a size on the order of a few microns to a size on the order of a few millimeters. In other configurations described below (e.g., toughened regions 132 formed by films), the toughened regions 132 may be substantially larger and they may even be continuous.

The toughened regions 132 are characterized as "toughened" because they are made of a material that is more resistant to crack propagation than the matrix 124. Toughness is a measure of the energy that can be absorbed in resistance to crack propagation. Toughness may be characterized by the GI and GII properties. As a first example, the composition of the matrix 124 is a thermoset, and the composition of the toughened regions 132 is a thermoplastic.

The toughened regions 132 are fused to the fiber beds 120A and 120B. That is, each toughened region 132 has first and second ends fused to the first and second fiber beds 120A and 120B, respectively.

FIG. 2A illustrates a configuration in which the toughened regions 132 are fused by mechanical interlocking. Opposite ends of the toughened regions 132 are mechanically interlocked with the first and second fiber beds 120A and 120B.

The toughened regions 132 may infiltrate the fiber beds 120A and 120B and move around the reinforcing fibers 122. For example, the thermoplastic material of the toughened regions 132 may fill spaces between reinforcing fibers 122 of the fiber beds 120A and 120B.

FIG. 2B illustrates a configuration in which the toughened regions 132 are fused by bonding. Opposite ends of the toughened regions 132 are bonded to the first and second fiber beds 120A and 120B. The bonding may be covalent or non-covalent (e.g., hydrogen bonding).

The toughened regions 132 may impede the propagation of through-plane cracks through the interlayer 130. The toughened regions 132 may impede the propagation of in-plane mode I cracks and in-plane mode II cracks. The in-plane mode I and mode II cracks include cracks along the edge of a fiber bed 120 (that is, the fiber-matrix interface at the interlayer 130), and cracks through the center of the fiber bed 120.

The applicants have found that fusing the toughened regions 132 to the fiber beds 120 improves the mode I and mode II performance with respect to in-plane cracks. Toughened regions 132 that are fused appear to be better at impeding in-plane crack propagation than toughened regions that are not fused.

Figure 3A:
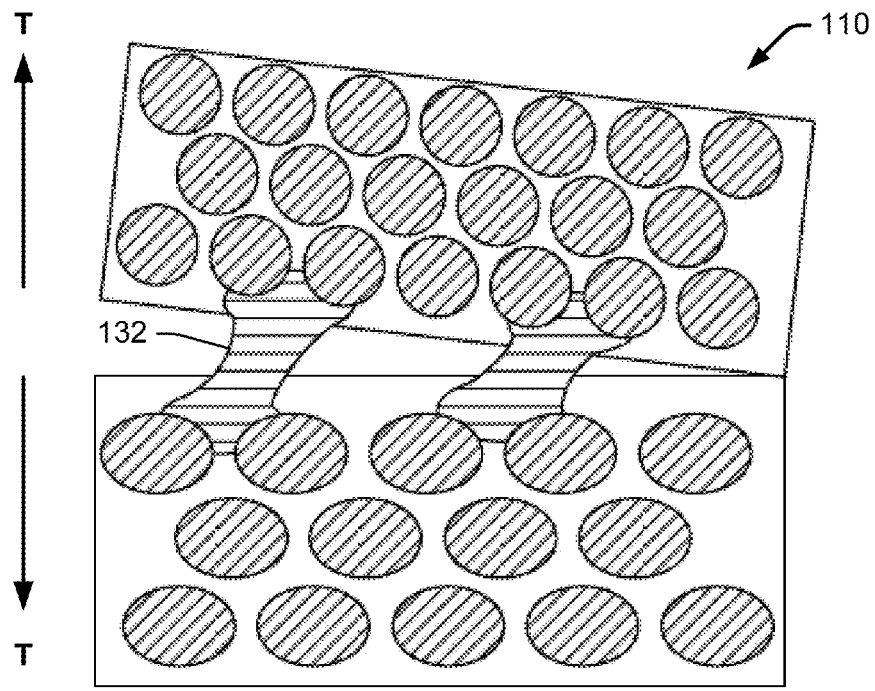
FIGS. 3A and 3B are illustrations of toughened regions in the interlayer with respect to mode I and mode II cracks.
Figure 3B:
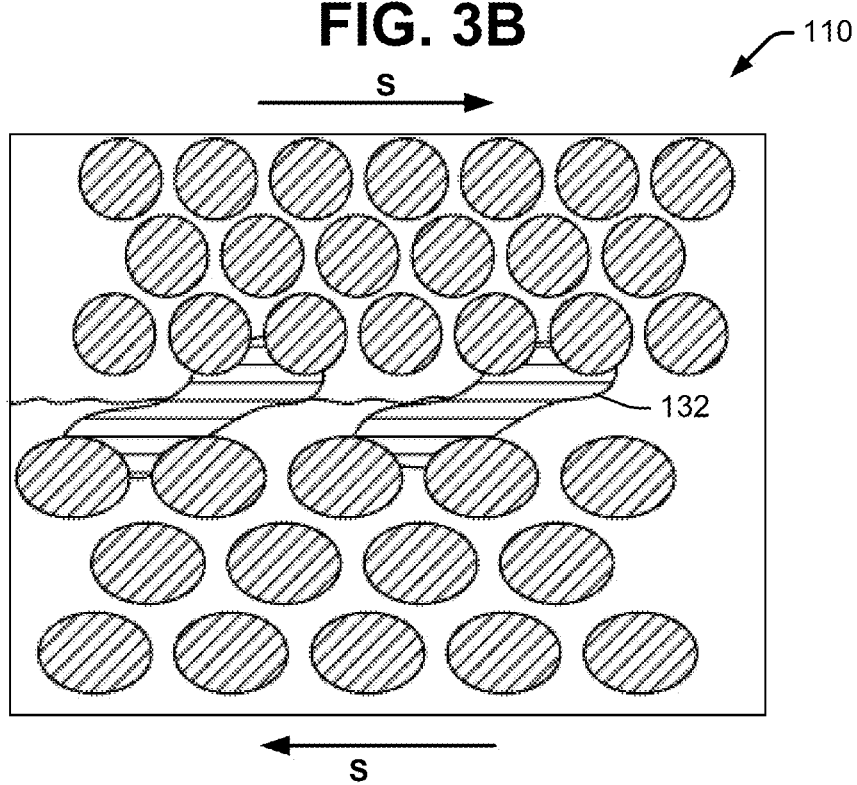

FIG. 3A illustrates an in-plane mode I crack, where a tensile stress (T) is normal to the plane of the crack. FIG. 3B illustrates an in-plane mode II crack, where a shear stress (S) acts parallel to the plane of the crack and perpendicular to the crack front. The toughened regions 132 absorb energy and thereby impede crack propagation, thereby improving mode I and mode II performance of the composite laminate 110. Consequently, the toughened regions improve interlaminar toughness and impact properties.

The toughened regions 132 are not limited to any particular configurations. Some configurations will be described below in connection with different methods of fabricating the composite laminate 110. These configurations include toughened regions 132 formed from particles, toughened regions 132 formed from filaments, and toughened regions 132 formed from films.

Reference is made to FIG. 4, which illustrates a general method of fabricating a composite laminate. At block 410, a plurality of toughened regions of an interlayer are fused to dry fiber beds. The toughened regions are bonded to and/or mechanically interlocking with their fiber beds.

At block 420, matrix resin is added to the fiber beds after the fusing. That is, the fiber beds are impregnated with matrix resin.

At block 430, curing is performed. As a result of curing, the reinforcing fibers of the fiber beds are embedded in a matrix. The toughened regions are more resistant to crack propagation than the matrix.

The applicants have found that fusing to resin-impregnated fibers beds is ineffective. Therefore, the fusing is performed on the dry fiber beds, and the dry fiber beds are impregnated with resin after fusing. Moreover, fusing prior to curing reduces fiber bed distortion. Bending or otherwise distorting the reinforcing fibers can reduce the strength of the composite laminate. During curing, toughened regions made of thermoplastic may become soft and, therefore, will not push against the fiber beds to move the reinforcing fibers significantly.

The form of the interlayer may also have an effect on fiber bending. Films, for instance, are flat and will apply even pressure during curing, resulting in minimal fiber bed distortion.

The method of FIG. 4 may be implemented by forming a stack of dry fiber beds and interlayers, fusing the toughened regions to their adjacent dry fiber beds, impregnating the stack with matrix resin, and curing the stack. However, FIG. 5 illustrates a different implementation.

Figure 5:
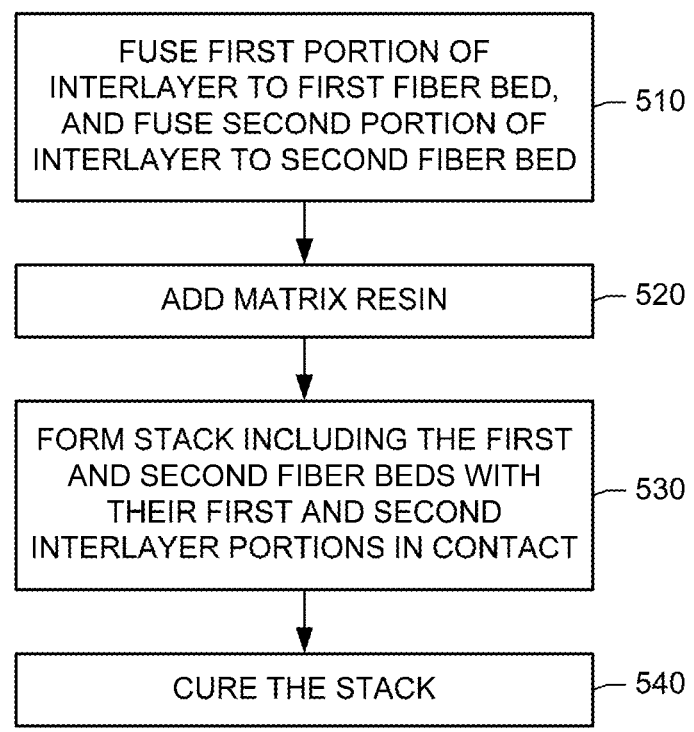
FIG. 5 is an illustration of an example of a method of fabricating a composite laminate including an interlayer having toughened regions.

Referring to FIG. 5, the interlayer is formed by first and second portions. At block 510, the first portion is fused to the first fiber bed, and the second portion is fused to the second fiber bed. At block 520, matrix resin is added to the first and second fiber beds.

At block 530, a stack is formed with the first and second fiber beds. The first and second fiber beds are adjacent, with their fused portions in contact. That is, the first interlayer portion is in contact with the second interlayer portion.

The stack may include a plurality of additional fiber beds. The stack may also include additional interlayers.

At block 540, the stack is cured. During curing, the first and second interlayer portions are fused together.

Figure 6:
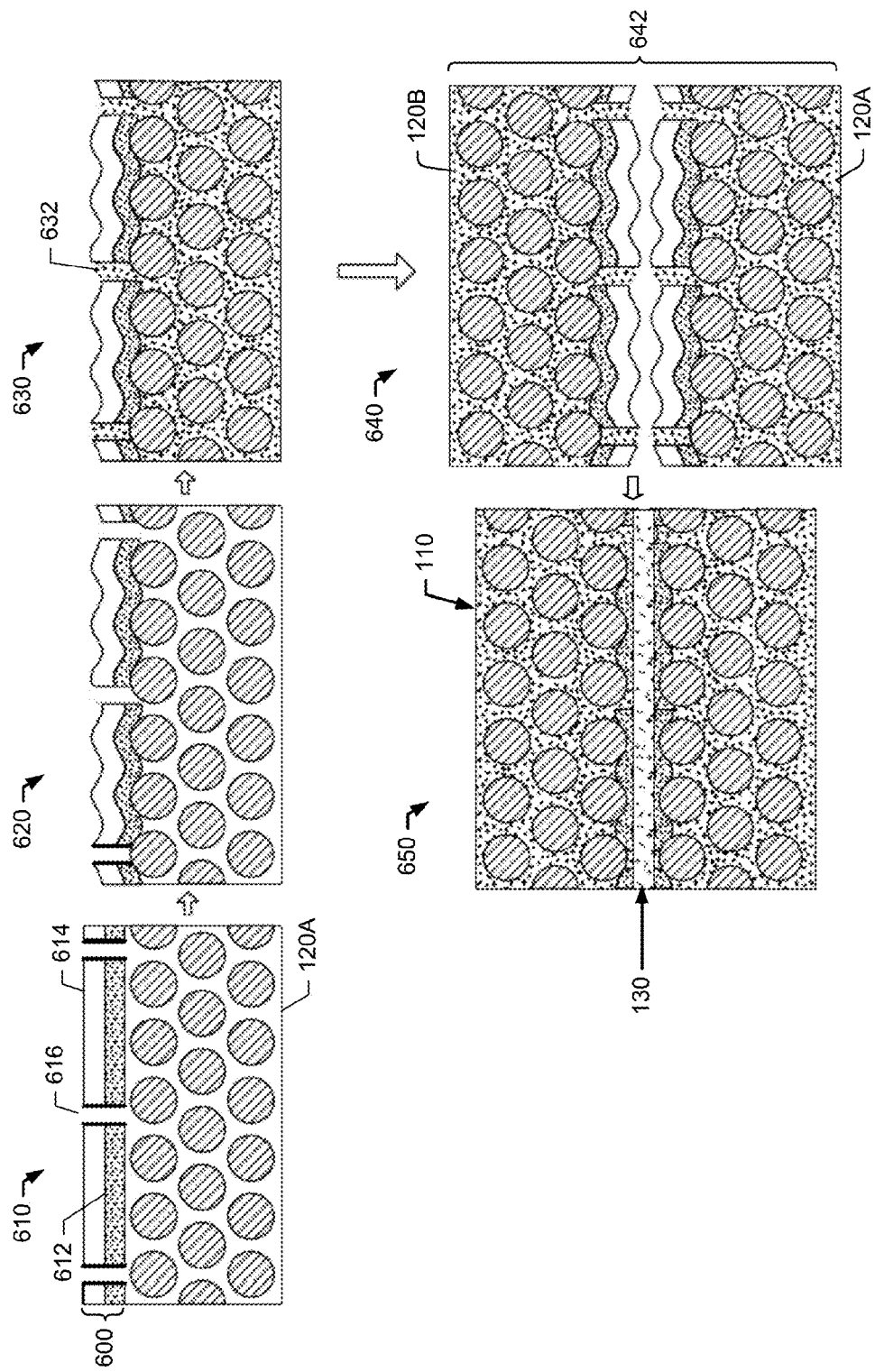
FIG. 6 is an illustration of a method of fabricating a composite laminate including an interlayer from partially soluble thermoplastic films and insoluble thermoplastic films.

FIG. 6 illustrates an example of an interlayer formed by first and second portions. Each interlayer portion 600 includes at least one partially soluble thermoplastic film 614 and an insoluble film 612.

At block 610, an interlayer portion 600 is placed on a fiber bed 120A, with the insoluble film 612 on the fiber bed 120A, and the partially soluble thermoplastic film 614 on the insoluble film 612. These two films 612 and 614 have through-holes 616, which are aligned.

At block 620, the insoluble film 612 is fused to its dry fiber bed 120A. Heat and pressure may be applied by a heated nip roller or other source. Heat without pressure may be applied by an infrared heater or other source.

At block 630, the fiber bed 120A is impregnated with matrix resin 632. The matrix resin 632 may be placed on the partially soluble film 614 and forced into the through-holes 616 and into the fiber bed 120A.

Blocks 610-630 are repeated for the second fiber bed 120B.

At block 640, an uncured stack 642 is formed. The first and second fiber beds 120A and 120B are stacked up with their partially soluble thermoplastic films 614 in contact. Additional fiber beds and interlayers (not shown) may be added to the stack 642. At this stage, the stack 642 is ready for curing.

At block 650, the stack is cured to produce a composite laminate 110. During curing, the partially soluble films 614 blend with the matrix resin 632. Thus, each insoluble film 612 creates a region of high thermoplastic content, and each partially soluble film 614 creates a surrounding region of lower thermoplastic content.

Interlayer thickness is controlled by thickness of the insoluble film 612 and the partially soluble film 614. The more that the partially soluble film 614 is dissolved, the thinner the interlayer 130 will be.

In another example, the partially soluble film may be omitted. Only insoluble films are formed on dry fibers beds, the insoluble films are fused to their dry fiber beds, the dry fiber beds are impregnated with matrix resin, a stack is formed, and the stack is cured. A thin layer of the impregnated matrix resin may form a bond between the two insoluble films, thus creating a continuous toughened region.

Figure 7:
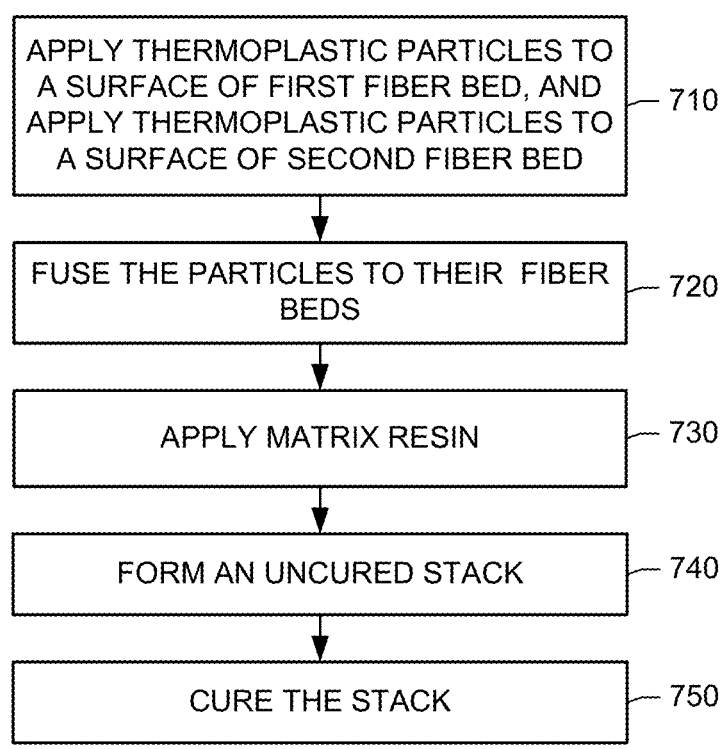
FIG. 7 is an illustration of a method of fabricating a composite laminate including an interlayer from particles of thermoplastic material.

Reference is made to FIG. 7, which illustrates an example of an interlayer including particles of thermoplastic material. At block 710, thermoplastic particles are applied to a surface of each of the first and second dry fiber beds. The particles may be applied by dispersing the particles in a solvent, applying the solvent to both surfaces of the each fiber bed, and flashing off the solvent. Instead, the particles may be applied by a powder coating process or electrostatic deposition.

At block 720, the particles are fused to their first and second fiber beds. Heat and pressure may be applied by a heated nip roller. Heat without pressure may be applied by an infrared heater or other source.

At block 730, matrix resin is applied to the first and second fiber beds.

At block 740, an uncured stack is formed. The first and second fiber beds are stacked up with at least some of the particles fused to the first fiber bed making contact with particles fused to the second fiber bed.

The stack may include additional fiber beds. The additional fiber beds may be pre-impregnated with matrix resin, or matrix resin may be impregnated with resin after stack up.

At block 750, the stack is cured. During curing, the contacting particles of the first and second fiber beds are fused together.

Figure 8:
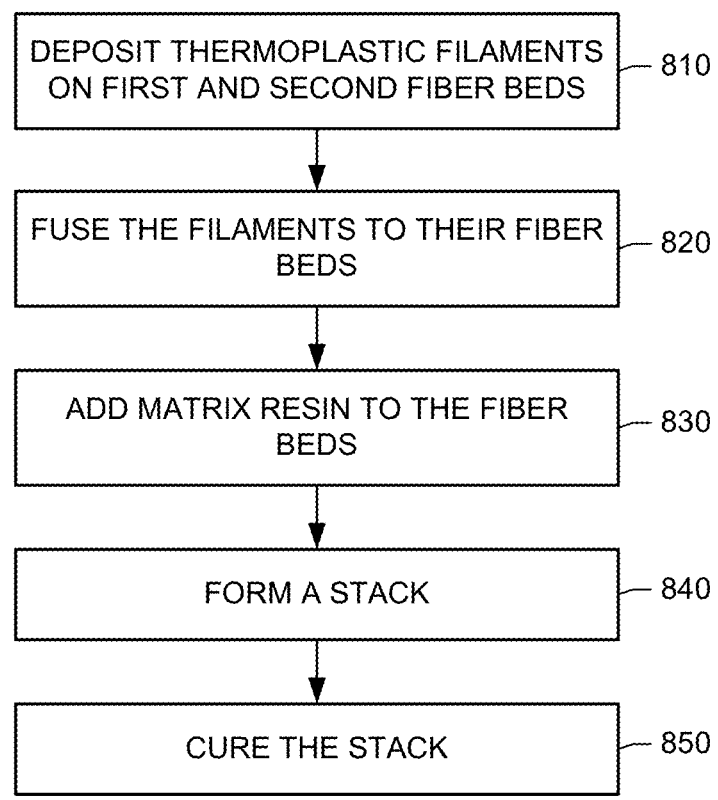
FIG. 8 is an illustration of a method of fabricating a composite laminate including an interlayer from filaments of thermoplastic material.

Reference is made to FIG. 8, which illustrates an example of an interlayer including filaments of thermoplastic material. At block 810, one or more layers of thermoplastic filaments are deposited on each of first and second dry fiber beds. The filaments may be in the form of a veil, or they may be deposited as individual filaments. The filaments on the first fiber bed may have different angular orientations than the filaments on the second fiber bed.

At block 820, the filaments are fused to their respective fiber beds. At block 830, the first and second fiber beds are impregnated with matrix resin. Matrix resin may also fill the spaces between the filaments in the interlayer.

At block 840, a stack is formed. The first and second fiber beds are stacked with the filaments on the first fiber bed making contact with the filaments on the second fiber bed. The stack may include additional fiber beds and interlayers.

At block 850, the stack is cured. The filaments on the opposing first and second fiber beds are fused together at their points of contact.

FIG. 9A illustrates an example in which the filaments 910 on the first fiber bed 120A are oriented at 0 degrees, and the filaments 920 on the second fiber bed 120B are oriented at a different angle (e.g., 45 degrees). FIG. 9B illustrates that the filaments 910 and 920 are fused together at their points 930 of contact. The fiber beds 120A and 120B may have the same orientation as their filaments 910 and 920. Thus, in the example of FIG. 9A, the first fiber bed 120A may be oriented at 0 degrees, and the second fiber bed 120B may be oriented at that different angle.

In another example, a single ply of thermoplastic veil may be fused between the fiber beds.

In each of the examples above, characteristics of an interlayer may be tailored. Interlayer characteristics may be tailored according to size and composition. Toughened regions formed by films may be tailored according to thickness and composition of the insoluble films and solubility of the partially soluble films.

Interlayer characteristics may also be tailored according to spatial density of the toughened regions (the spatial density refers to the number of particles or filaments per unit area) and/or different compositions for the toughened regions.

An interlayer may be patterned to provide different levels of toughness. Consider the example in FIG. 10. FIG. 10 illustrates one of many possible patterns for an interlayer 130: a checkerboard pattern. For the interlayer 130 of FIG. 10, the darker portions 1010 represent a high density of toughened regions, and the lighter portions 1020 represent a low density of toughened regions. The darker portions 1010 provide maximum toughness while the lighter portions 1020 provide less toughness.

FIG. 10 shows the portions 1010 and 1020 having rectangular shapes. Other shapes include, but are not limited to squares, diamonds, circles, and rectangles.

FIG. 10 shows roughly fifty percent of the darker (higher density) portions 1010, and fifty percent of the lighter (lower density) portions 1020. However, the pattern is not limited to two distinct densities in equal proportions. Other patterns may have different relative percentages of the densities. Other patterns may have more than two distinct densities. Other patterns may provide progressive levels of densities.

Different toughened regions may be made of different compositions by using different materials for the soluble coatings. The different coatings may have different inherent toughness values. An interlayer portion having higher toughness may be formed by using a higher density of filaments or particles having tougher coatings.

Some patterns may have portions that are also tailored according to modulus and/or strength. For example, an interlayer may include a pattern of high strength portions, lower strength, and high toughness portions.

In some patterns, portions may be embedded within other portions. For instance, a high toughness portion may be surrounded by a high strength portion, which may be adjacent a lower strength portion.

The invention claimed is:

1. A composite laminate comprising:
   first and second fiber beds; and
   an interlayer between the fiber beds, the interlayer including toughened regions consisting of one of thermoplastic particles, thermoplastic filaments, and at least one thermoplastic film, the toughened regions extending between the first and second fiber beds in a through-plane direction and each of the toughened regions including first and second ends respectively fused to the first and second fiber beds by mechanical interlocking or bonding.

2. The laminate of claim 1, wherein the toughened regions are continuous in the through-plane direction and discontinuous in an in-plane direction.

3. The laminate of claim 1, wherein the fiber beds include reinforcing fibers embedded in a matrix.

4. The laminate of claim 3, wherein composition of the matrix includes a thermoset.

5. The laminate of claim 1, wherein the toughened regions are mechanically interlocked to the first and second fiber beds.

6. The laminate of claim 1, wherein the toughened regions are bonded to the first and second fiber beds.

7. The laminate of claim 1, wherein the toughened regions consist of at least one thermoplastic film.

8. The laminate of claim 1, wherein the toughened regions consist of thermoplastic particles.

9. The laminate of claim 1, wherein the toughened regions consist of thermoplastic filaments.

10. The laminate of claim 1, wherein the interlayer is patterned to provide a plurality of portions having different levels of resistance to crack propagation, the different portions having at least one of different spatial densities of toughened regions and different compositions for the toughened regions.

11. A method comprising fabricating a composite laminate including fusing a plurality of toughened regions of an interlayer to adjacent dry first and second fiber beds, the toughened regions consisting of one of thermoplastic particles, thermoplastic filaments, and at least one thermoplastic film, the thermoplastic regions extending between the first and second fiber beds in a through-plane direction and each including first and second ends respectively fused to the first and second fiber beds by mechanical interlocking or bonding.

12. The method of claim 11, wherein fabricating the composite laminate further includes adding matrix resin to the fiber beds after fusing the thermoplastic regions, and thereafter curing the matrix resin.

13. The method of claim 11, wherein the interlayer includes first and second portions; and the first portion is fused to the first fiber bed, the second portion is fused to the second fiber bed; and the fiber beds are stacked with the first and second portions making contact.

14. The method of claim 13, wherein the first and second fiber beds are impregnated with matrix resin after the fusing but before the stacking.

15. The method of claim 14, wherein fabricating the composite laminate further includes curing the stack, whereby the first and second portions of the interlayer are fused together.

16. The method of claim 14, wherein each portion includes an insoluble thermoplastic film, and a soluble thermoplastic film on the insoluble film; wherein each insoluble film is fused to its fiber bed; wherein matrix resin is infused into the fiber beds via through-holes in the films; and wherein the fiber beds are stacked with the soluble films making contact.

17. The method of claim 16, further comprising curing the stack, whereby the soluble films blend with the matrix resin.

18. The method of claim 13, wherein the first portion includes first thermoplastic particles that are fused to the first fiber bed, and the second portion includes second thermoplastic particles that are fused to the second fiber bed; and wherein at least some of the first and second particles make contact when the first and second fiber beds are stacked.

19. The method of claim 13, wherein the first portion includes first thermoplastic filaments that are fused to the first fiber bed, and the second portion includes second thermoplastic filaments that are fused to the second fiber bed; and wherein the first and second filaments make contact when the first and second fiber beds are stacked.

20. The method of claim 19, wherein the first filaments and the first fiber bed are oriented at a first angle, and the second filaments and the second fiber bed are oriented at a second angle.

21. The composite laminate of claim 1, wherein the first and second fiber beds are dry.

* * * * *